UNITED STATES PATENT OFFICE.

THOMAS MADDEN, OF PHILADELPHIA, PENNSYLVANIA.

IMPROVEMENT IN COMPOUNDS FOR MARKING CATTLE AND SHEEP.

Specification forming part of Letters Patent No. 206,889, dated August 13, 1878; application filed November 30, 1877.

*To all whom it may concern:*

Be it known that I, THOMAS MADDEN, of Philadelphia, in the county of Philadelphia and State of Pennsylvania, have invented a certain new and useful Composition for Marking Cattle and Sheep; and do hereby declare the following to be a full, clear, and exact description of the invention, such as will enable others skilled in the art to which it pertains to make and use it.

My invention has for its object to provide a soft chalk or compound for marking cattle and sheep, which can be readily applied, and which, while retaining legibility long enough for all ordinary practical purposes, will not injure fleeces, and may be removed therefrom in the process of scouring.

This chalk or compound is prepared as follows: Take terra-alba, six ounces; china-clay, two ounces; lard, two pennyweights; soap, two pennyweights; pure red oxide of iron, two ounces. Mix the terra-alba and china-clay dry. Dissolve the soap in water and incorporate with the lard. Mingle the soap and lard with the dry matter, to which the red oxide is added, and use a sufficient quantity of water to bring the mass to a pasty condition, or to or about the consistency of tempered brick-clay. When ready to be molded, place in molds, and dry by any suitable means until the water is evaporated.

Instead of the red oxide, which is the coloring ingredient, one-half ounce indigo may be used.

If the red oxide be used, the color of the compound will be red. If the indigo be employed, it will be blue.

What I claim as my invention is—

A compound for marking cattle and sheep, composed of terra-alba, china-clay, lard, soap, with pure red oxide of iron, or other coloring ingredient, in or about the proportions specified.

In testimony that I claim the foregoing I have hereunto set my hand.

THOMAS MADDEN.

Witnesses:
 GEO. C. SHELMERDINE,
 SAML. J. VAN STAVOREN.